United States Patent [19]
Burtin et al.

[11] Patent Number: 5,703,770
[45] Date of Patent: Dec. 30, 1997

[54] METHOD AND APPARATUS FOR GENERATING A HIGH VOLTAGE

[75] Inventors: Jean Pierre Burtin, Egreve; Flavien Dobrowolski, Sinard; Caryl Thome, Saint Egreve, all of France

[73] Assignee: Sames S.A., France

[21] Appl. No.: 513,027

[22] Filed: Aug. 9, 1995

[30] Foreign Application Priority Data

Sep. 16, 1994 [FR] France .................. 94 11340
Dec. 21, 1994 [FR] France .................. 94 15669

[51] Int. Cl.$^6$ .................................................. H02M 7/10
[52] U.S. Cl. ................................. 363/61; 363/15; 363/95
[58] Field of Search .............................. 363/15, 17, 59, 363/61, 95, 98

[56] References Cited

U.S. PATENT DOCUMENTS

| | | | |
|---|---|---|---|
| 3,579,078 | 5/1971 | Cronin | 363/60 |
| 4,092,712 | 5/1978 | Harrigill et al. | 363/60 |
| 4,323,947 | 4/1982 | Huber | 363/61 |
| 4,393,441 | 7/1983 | Enge | 363/61 |
| 4,616,300 | 10/1986 | Santelmann | 363/61 |
| 4,674,003 | 6/1987 | Zylka | 363/95 |
| 4,749,836 | 6/1988 | Matsuo et al. | 219/10.77 |
| 4,855,891 | 8/1989 | Paul | 363/61 |
| 4,888,821 | 12/1989 | Hamp et al. | 363/61 |
| 4,890,210 | 12/1989 | Myers | 363/61 |
| 4,893,227 | 1/1990 | Gallios et al. | 363/61 |
| 5,003,141 | 3/1991 | Braunisch et al. | 363/61 |
| 5,053,727 | 10/1991 | Jann et al. | 363/61 |

FOREIGN PATENT DOCUMENTS

| | | | |
|---|---|---|---|
| 0160179 | 11/1985 | European Pat. Off. | H02M 3/335 |
| 0589202 | 3/1994 | European Pat. Off. | H02M 7/10 |
| 2183941 | 6/1987 | United Kingdom | H05B 6/04 |

*Primary Examiner*—Jeffrey L. Sterrett
*Attorney, Agent, or Firm*—Loeb & Loeb LLP

[57] ABSTRACT

A method and apparatus for generating a high voltage by converting input power at a low voltage to output power at a high voltage, by: supplying input power to a low voltage unit to produce a periodic signal having a frequency; supplying the periodic signal to a rectifier voltage multiplier of a specific type to cause the rectifier voltage multiplier to produce the output power at a high voltage, wherein the ratio of output power to input power is a function of the frequency of the periodic signal; identifying the type of the rectifier voltage multiplier; and continually adjusting the frequency of the periodic signal toward a value which maximizes the ratio of output power to input power.

20 Claims, 1 Drawing Sheet

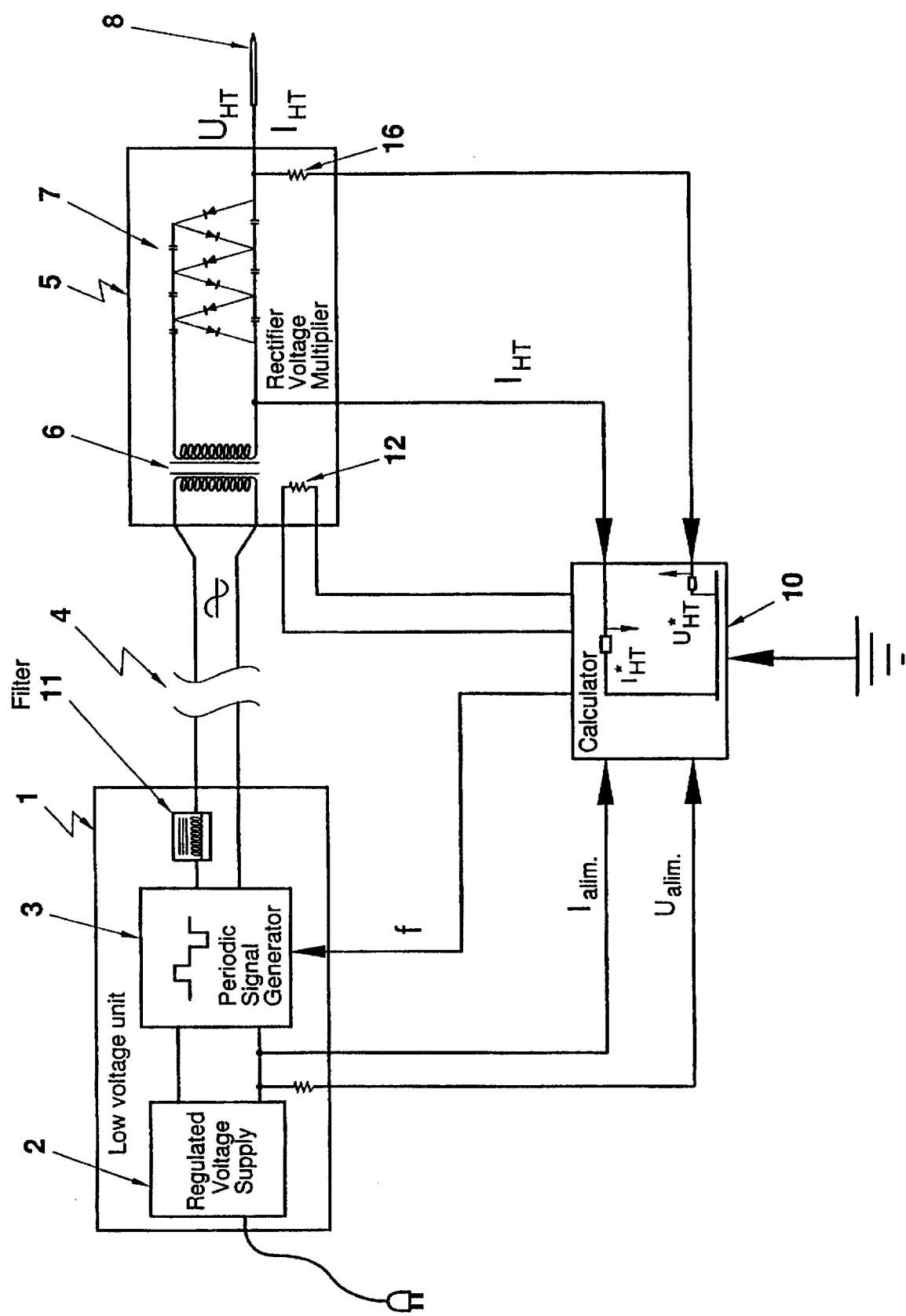

METHOD AND APPARATUS FOR GENERATING A HIGH VOLTAGE

BACKGROUND OF THE INVENTION

The present invention concerns a process and apparatus for producing a high voltage, particularly for use in the electrostatic application of coating products, and particularly in an installation for spraying such a product in liquid or powder form.

In such installations, which can be manual or automatic, one or several electrodes are maintained at a high voltage to create an electrostatic field between the sprayer and the object to be coated. The voltage furnished to one electrode is of the order of several tens of kilovolts. In order to supply electricity to such an electrode from a power mains or any other conventional voltage source such as storage batteries, it is thus necessary to substantially increase the voltage level. The supply current is generally limited to several Ma for safety reasons and to limit the electric power consumed by the electrode, this power being partially dissipated in the form of heat in the apparatus.

One essential constraint on electrostatic coating installations resides in the fact that the sprayer is movable and is disposes in a location which is generally inaccessible and of small size, in the case of an automatic installation, or indeed as carried at the end of an arm by an operator in the case of a manual installation. It is thus important that this sprayer be light and easy to handle. In order to improve the maneuverability of the sprayer, the electrode often supplied electrically by two subsystems, one situated at a fixed position and near the installation and normally called a "low voltage unit", and the other located in contact with the sprayer and which will here be called the "rectifier voltage multiplier". The two units are connected together by a cable of electric conductors.

In systems known in the prior art, the electric signal flowing in the cable is periodic and, in order to obtain a maximum output voltage, it is necessary to give the periodic signal a frequency close to the resonance frequency of the rectifier voltage multiplier. This resonance frequency can be calculated on the basis of the circuit design of the rectifier voltage multiplier or determined in the course of operation by a measurement of the voltage downstream of the transformer at the input of the rectifier voltage multiplier, which permits to take account of variations in the resonance frequency from rectifier voltage multiplier to another and over the course of time for a given rectifier voltage multiplier. The maximum output voltage determines the operating point of the device. Such systems are disclosed, for example, in French Patent A2618618 and U.S. Pat. No. 5,159,544.

Now, the operating point determined in this manner does not take account of the current flowing through the apparatus. This current can be substantial and induces significant heat dissipation and iron/dielectric losses in the transformer windings. It can even lead to the destruction of certain components by Joule effect and require that the installation be taken out of service.

In addition, during the operating life of the system composed of a low voltage unit and a rectifier voltage multiplier, it is sometimes necessary to replace one of the two subsystems. It is then necessary for the operator to verify the compatibility of the new subsystem with that which it replaces, which necessitates certain complex electronic manipulations, with the attendant risk of destroying one or the other of the subsystems for example as a result of heating in the case of improper operation. If the functioning of the low voltage unit is unsuitable with respect to the requirements of the rectifier voltage multiplier, the resulting operation can be dangerous for the operator.

SUMMARY OF THE INVENTION

Objects of the invention are to resolve the above-stated problems.

One specific object of the invention is to optimize the conversion of low voltage power to high voltage power.

Another specific object of the invention is to optimize starting conditions of high voltage generating apparatus.

A further specific object of the invention is to facilitate adaptation of a low voltage unit to different types of rectifier voltage multipliers forming such apparatus.

The above and other objects are achieved, according to the invention, by a method and apparatus for generating a high voltage by converting input power at a low voltage to output power at a high voltage, by: supplying input power to a low voltage unit to produce a periodic signal having a frequency; supplying the periodic signal to a rectifier voltage multiplier of a specific type to cause the rectifier voltage multiplier to produce the output power at a high voltage, wherein the ratio of output power to input power is a function of the frequency of the periodic signal; identifying the type of the rectifier voltage multiplier; and continually adjusting the frequency of the periodic signal toward a value which maximizes the ratio of output power to input power.

One result produced by the process and apparatus according to the invention is that, for a given output power, the input power is minimum. The input current and voltage are optimum for generating sufficient output current and voltage without risk of damage to the apparatus. In further accordance with the invention, the frequency of the periodic signal is continually adjusted to optimize power, whatever may be the desired current and voltage values and even if the operating conditions have an influence on the behavior of the apparatus, as for example a long period of use which can lead to a heating of the components and to a modification of their characteristics.

In particular, a calculator is utilized to determine the most appropriate frequency. It operates on the basis of values of the current and voltage supplied to the low voltage unit and the current and voltage in the rectifier voltage multiplier. According to one embodiment of the invention, all of these values being DC, the programming and utilization of the calculator are simplified.

The invention will be better understood and other advantages thereof will appear more clearly from the following description of a preferred embodiment of apparatus for producing a high voltage for an installation for electrostatic spraying of a coating product, presented solely by way of nonlimiting example.

BRIEF DESCRIPTION OF THE DRAWING

The sole FIGURE is a circuit diagram of a preferred embodiment of apparatus according to the invention.

DESCRIPTION OF THE PREFERRED EMBODIMENTS

The apparatus shown in the FIGURE is composed essentially of a low voltage unit 1 and a rectifier voltage multiplier 5. Unit 1 is composed essentially of a regulated voltage supply 2 connectable to a power outlet of a building power system and delivering an adjustable direct voltage to a generator 3 which generates a periodic electric current having a frequency, f, which frequency is controllable. Supply 2 could also be powered by a battery or any other power source. The periodic electric signal generated by low voltage unit 1 is a square wave signal having a constant form selected to minimize first order harmonics, i.e. a square wave which is as close as possible to a perfect sinusoid. A filter 11 permits partial smoothing of the signal from generator 3. The amplitude of the wave is variable as a function of the voltage supplied to generator 3 by voltage source 2. Although the signal waveform described above is particularly advantageous and simple to generate and use, any other periodic signal, in particular a sinusoidal signal, can be utilized in the practice of the present invention.

The periodic signal output from unit 1 is applied via a multiconductor cable 4 to the inlet of rectifier voltage multiplier 5. Rectifier voltage multiplier 5 includes an input transformer 6 and a voltage multiplier 7. The output of voltage multiplier 7 is connected to a high voltage electrode 8 of an electrostatic sprayer for applying a coating product (not shown). The specific arrangement and component values for voltage multiplier 7 can be selected on the basis of principles already well known in the art. In the illustrated embodiment, voltage multiplier 5 is composed essentially of an arrangement of diodes, with successive diodes being isolated from one another, with respect to DC, by suitable capacitors.

The operator can decide to vary the voltage delivered to electrode 8 as a function of the spray characteristics desired and/or as a function of the form of the objects to be coated. The current also varies as a function of high voltage discharges at the level of electrode 8, which depend on its environment, such as for example the distance to the nearest ground point. The temperature of the components also has an influence on their characteristics and thus on the periodic signal frequency which will permit a given voltage to be obtained. For all of these reasons, the frequency, f, of the periodic signal delivered by generator 3 is controlled by a calculator 10.

According to the invention, calculator 10 determines the efficiency of the high voltage generating apparatus constituted by low voltage unit 1 and rectifier voltage multiplier 5 as being the ratio of the output power from rectifier voltage multiplier 5 to the input power to unit 1. More precisely, these powers are calculated on the basis of the values of voltage ($U_{HT}$) and of the current ($I_{HT}$) in rectifier voltage multiplier 5 on the one hand, and the voltage ($U_{alim}$) and the current ($I_{alim}$) supplied to generator 3 in the low voltage unit, on the other hand.

The voltage ($U_{HT}$) is measured at the output of voltage multipier 7 at a point adjacent electrode 8, the measuring point being selected to assure that $U_{HT}$ is substantially equal to the voltage between electrode 8 and ground. The value of $U_{HT}$, representative of the high voltage available to electrode 8, is measured across a measuring resistance 16. The measured value, $U_{HT}*$ is provided to an input of calculator 10.

The high voltage direct current ($I_{HT}$) is measured at a point upstream of voltage multiplier 7, where that current flows through a conductor that also carries an alternating current from transformer 6. The current component ($I_{HT}$) flowing through the measuring line is conducted to an input of calculator 10 and is a direct current because it is equal to the current flowing through electrode 8. The value of this current reaching calculator 10 is $I_{HT}*$. The DC values $H_{HT}*$ and $I_{HT}*$ are images, or representative, of the physical quantities being measured, $U_{HT}$ and $I_{HT}$, and can be measured in calculator 10. As shown in the FIGURE, each of these quantities is measured with respect to system ground.

As also shown in the FIGURE, the DC voltage ($U_{alim}$) is measured between one output terminal of voltage supply 2 and system ground.

Calculator 10 is configured to vary the frequency f of the periodic signal produced in generator 3 in increments, or steps, the variation being performed in a given direction, i.e. increasing or decreasing, as long as the output power/input power ratio continues to increase as a function of frequency, and the direction of variation of frequency being reversed as soon as a decrease in the ratio is noted.

Thus, for a given high voltage at the output, selected by the operator, for example 80 kV, the output current $I_{HT}$ will be a minimum, which permits the avoidance of dangerous heat dissipation and significant iron/dielectric losses. For a given output power, the input power is also a minimum. Electric consumption of the device is thus minimum, which presents a significant economic advantage. In effect, certain industrial installations have a large number of coating product sprayers and, as a result, a large number of associated high voltage generators. In addition, it has become current practice to supply certain high voltage generators from storage batteries, with the result that, in the case of manual sprayers, for example, the apparatus is more maneuverable. The size of such batteries being limited, optimization of the consumed power permits the operating time of the apparatus to be extended.

Since the voltage and current values to be measured are essentially DC, i.e., not alternating, the calculator can determine each power value by a simple multiplication. The frequency, f, can be varied in increments, or steps, at a rate of once every 200 ms. The invention can also be applied to devices in which the measured values are periodic. Calculator 10 would then function, as is already known in the art, to integrate the phase difference between each voltage and its associated current. However, this requires additional programming and a more advanced calculator.

The invention also permits a given low voltage unit to be used with different types of rectifier voltage multipliers. In effect, each rectifier voltage multiplier can be provided with an associated resistor 12 having a resistance value representative of the type of the associated rectifier voltage multiplier. Resistor 12 can be connected to suitable inputs of calculator 10 which measures its resistance in any appropriate, known manner, as by measuring the voltage drop thereacross, in order to obtain an indication of the value of the rectifier voltage multiplier type.

Upon connection of rectifier voltage multiplier to low voltage unit 1, measurement of the value of the resistance of resistor 12 by calculator 10 permits calculator 10 to determine the rectifier voltage multiplier type and to then establish a starting value for the frequency, f. The starting value could be, for example, the value previously determined to theoretically be the optimum frequency for the particular type of rectifier voltage multiplier. The value of the resistance of resistor 12 thus permits generator 3 to immediately be provided with an assigned value of frequency, f, close to the optimum value for that rectifier voltage multiplier. The frequency incrementing, or stepping, process then takes place over a smaller frequency range. The optimum frequency is thus achieved more rapidly each time the apparatus is placed into service, and in particular upon connection of rectifier voltage multiplier 5 to low voltage unit 1. This identification of the rectifier voltage multiplier type can also serve as a safety measure or to verify compatibility between the components. Measurement of the resistance value of resistor 12 can also be effectuated by any known measurement system.

In the illustrated embodiment, low voltage unit 1 is physically separate from rectifier voltage multiplier 5, the two components being connected together by a cable 4. However, the invention can also be applied to devices in which low voltage unit 1 and rectifier voltage multiplier 5 are both part of a single integrated or compact system.

This application relates to subject matter disclosed in French Application numbers FR 94 11340 filed Sep. 16, 1994 and FR 94 15669, filed on Dec. 12, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for generating a high voltage by converting input power at a low voltage to output power at a high voltage, comprising: supplying input power to a low voltage unit to produce a periodic signal having a frequency; supplying the periodic signal to a rectifier voltage multiplier of a specific type to cause the rectifier voltage multiplier to produce the output power at a high voltage, wherein the ratio of output power to input power is a function of the frequency of the periodic signal; identifying the type of the rectifier voltage multiplier; and continually adjusting the frequency of the periodic signal toward a value which maximizes the ratio of output power to input power.

2. A method for generating a high voltage by converting input power at a low voltage to output power at a high voltage, comprising: supplying input power to a low voltage unit to produce a periodic signal having a frequency; supplying the periodic signal to a rectifier voltage multiplier to cause the rectifier voltage multiplier to produce the output power at a high voltage, wherein the ratio of output power to input power is a function of the frequency of the periodic signal; and continually adjusting the frequency of the periodic signal toward a value which maximizes the ratio of output power to input power.

3. A method as defined in claim 2 wherein said step of adjusting comprises supplying to inputs of a calculator signals representing the input power voltage and current and the output power voltage and current and operating the calculator to produce a signal which adjusts the frequency of the periodic signal.

4. A method as defined in claim 3 wherein the calculator is operated to vary the frequency of the periodic signal in increments in a given direction as long as the ratio increases with changes in frequency, and in the opposite direction after the ratio begins to decrease with changes in frequency.

5. A method as defined in claim 3 wherein the voltages and currents represented by signals are DC.

6. A method as defined in claim 2 wherein the high voltage is applied to an electrode of an electrostatic sprayer for a coating product.

7. An apparatus for generating a high voltage by converting input power at a low voltage to output power at a high voltage, comprising: a low voltage unit connected to receive the input power to produce a periodic signal having a frequency; a rectifier voltage multiplier connected to receive the periodic signal to cause the rectifier voltage multiplier to produce the output power at a high voltage, wherein the ratio of output power to input power is a function of the frequency of the periodic signal; and means connected for continually adjusting the frequency of the periodic signal toward a value which maximizes the ratio of the output power and the input power.

8. An apparatus as defined in claim 7 wherein said step of adjusting comprises supplying to inputs of a calculator signals representing the input power voltage and current and the output power voltage and current and operating the calculator to produce a signal which adjusts the frequency of the periodic signal.

9. An apparatus as defined in claim 8 wherein the voltages and currents represented by signals are DC.

10. An apparatus as defined in claim 8 wherein the periodic signal is a square wave signal having a waveform selected to minimize first order harmonic content.

11. An apparatus as defined in claim 10 wherein said low voltage unit is controllable to vary the amplitude of the periodic signal.

12. An apparatus as defined in claim 8 wherein said rectifier voltage multiplier has an output for supplying the high voltage power to an electrode and the signal representing output power voltage supplied to said calculator is derived at the rectifier voltage multiplier output.

13. An apparatus as defined in claim 7 wherein said low voltage unit is constructed to function with rectifier voltage multipliers of different types and said apparatus comprises means for identifying the type of said rectifier voltage multiplier.

14. An apparatus as defined in claim 13 wherein said means for identifying determine an initial frequency value for the periodic signal at the start of operation of said apparatus.

15. An apparatus as defined in claim 13 wherein said means for identifying comprise a component for providing an electrical signal representing the type of said rectifier voltage multiplier.

16. An electrostatic sprayer for spraying a coating product, said sprayer comprising a high voltage electrode, in combination with apparatus as defined in claim 7, wherein said rectifier voltage multiplier has an output connected to said electrode.

17. A method for generating a high voltage, comprising: producing a periodic signal in a low voltage unit; supplying the periodic signal to a rectifier voltage multiplier of a selected type to cause the rectifier voltage multiplier to produce the high voltage; and identifying the type of the rectifier voltage multiplier.

18. A method as defined in claim 17 wherein said step of identifying comprises producing an electrical signal having a value representative of the type of the rectifier voltage multiplier.

19. Apparatus for generating a high voltage, comprising: a low voltage unit for producing a periodic signal; a rectifier voltage multiplier of a selected type connected to receive the low voltage signal to cause the rectifier voltage multiplier to produce the high voltage; and means for identifying the type of the rectifier voltage multiplier.

20. An apparatus as defined in claim 19 wherein said means for identifying comprise a component for providing an electrical signal representing the type of said rectifier voltage multiplier.

* * * * *